(12) United States Patent
Young

(10) Patent No.: US 6,320,612 B1
(45) Date of Patent: Nov. 20, 2001

(54) VEHICULAR CAMERA SYSTEM WITH PLURAL PERSPECTIVES

(76) Inventor: Jan J. Young, 8 Holbrook Court, Unionville, Ontario (CA), L3R 7P5

( * ) Notice: Subject to any disclaimer, the term of this patent is extended or adjusted under 35 U.S.C. 154(b) by 0 days.

(21) Appl. No.: 09/076,699

(22) Filed: May 12, 1998

(51) Int. Cl.[7] ............................... H04N 7/18; H04N 9/47
(52) U.S. Cl. ............................................................ 348/148
(58) Field of Search ........................... 348/148, 36, 118, 348/149, 151, 419, 207; 359/366; H04N 7/18, 9/47

(56) References Cited

U.S. PATENT DOCUMENTS

| | | | |
|---|---|---|---|
| 3,689,695 | * | 9/1972 | Rosenfield et al. .................. 348/148 |
| 4,277,804 | * | 7/1981 | Robinson .............................. 348/148 |
| 4,910,591 | * | 3/1990 | Petrossian et al. .................. 348/148 |
| 5,027,200 | * | 6/1991 | Petrossian et al. .................. 348/148 |
| 5,289,321 | * | 2/1994 | Secor .................................... 348/148 |
| 5,648,835 | * | 7/1997 | Uzawa ..................................... 348/36 |
| 6,035,212 | * | 3/2000 | Rostoken et al. .................... 455/522 |
| 6,078,355 | * | 6/2000 | Zengel ................................. 348/148 |
| 6,151,065 | * | 11/2000 | Steed et al. .......................... 348/148 |

* cited by examiner

*Primary Examiner*—Nhon T. Diep

(57) ABSTRACT

A vehicular video system is provided including a vehicle having a plurality of controls including a turn lever. Also included is at least one camera adapted to generate video signals of a perspective which faces forward from either side of the vehicle. Next provided is a display mounted within the vehicle for displaying video images upon the receipt of corresponding video signals. A processor is adapted to transmit the video signals of a tight and left perspective of the camera to the display upon the biasing of the turn signal lever in a right and left direction respectively.

6 Claims, 3 Drawing Sheets

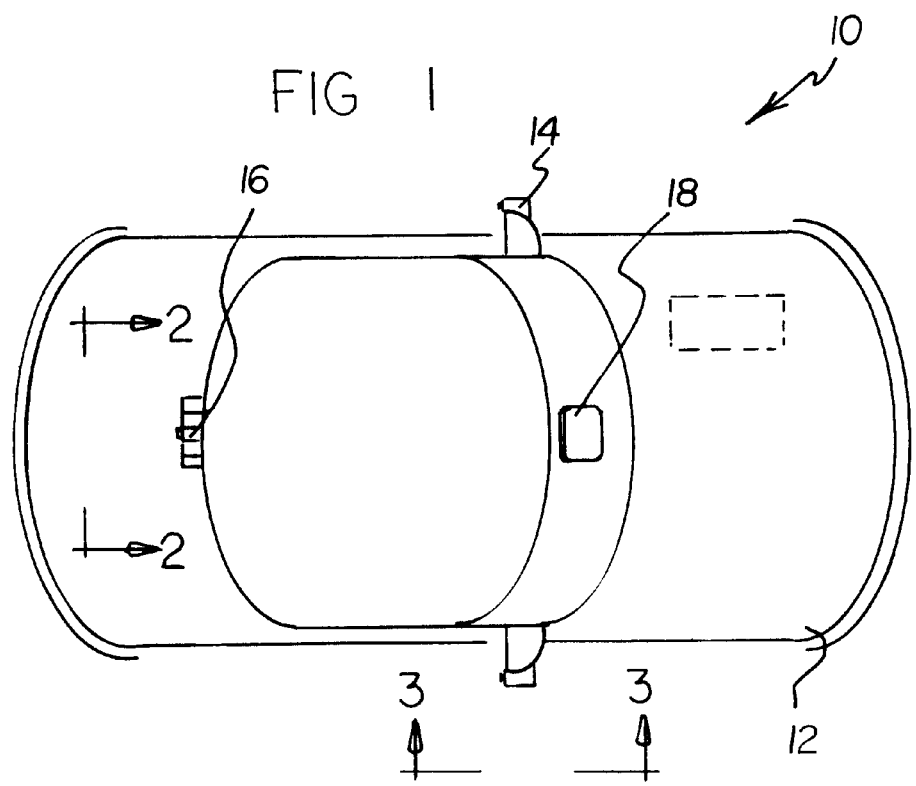
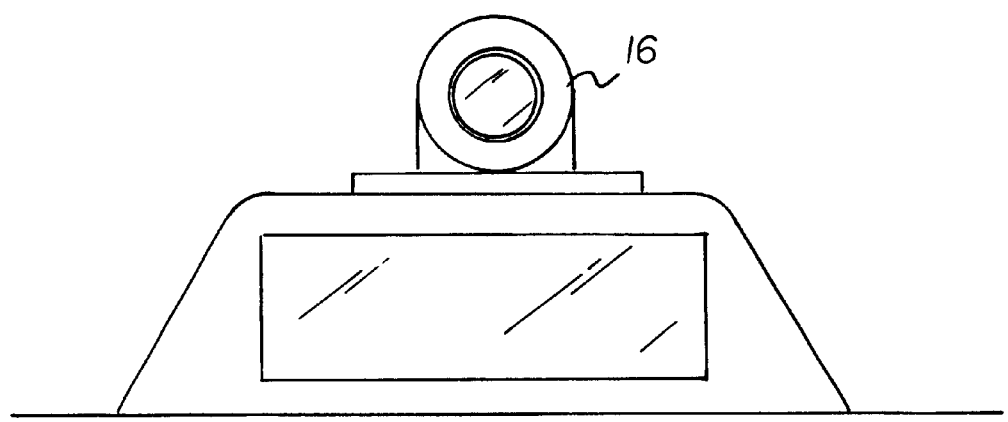

FIG 5
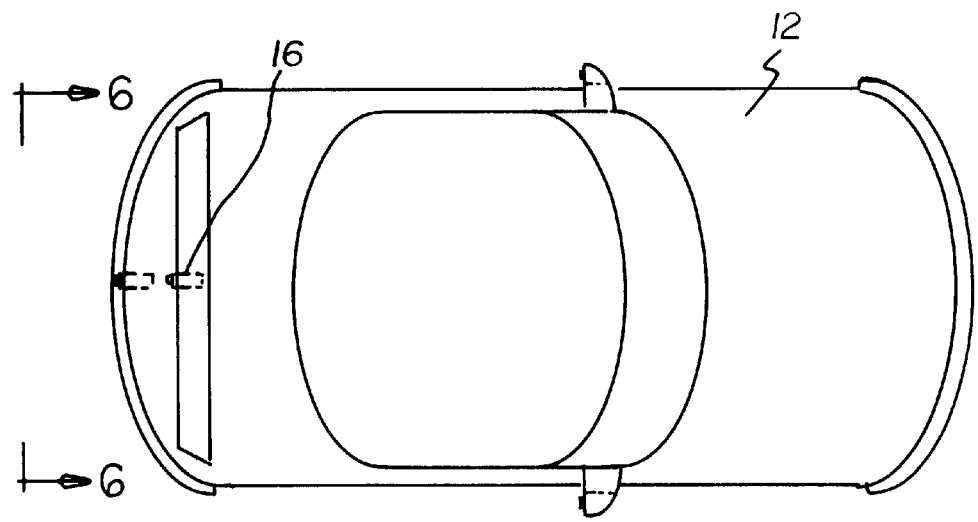
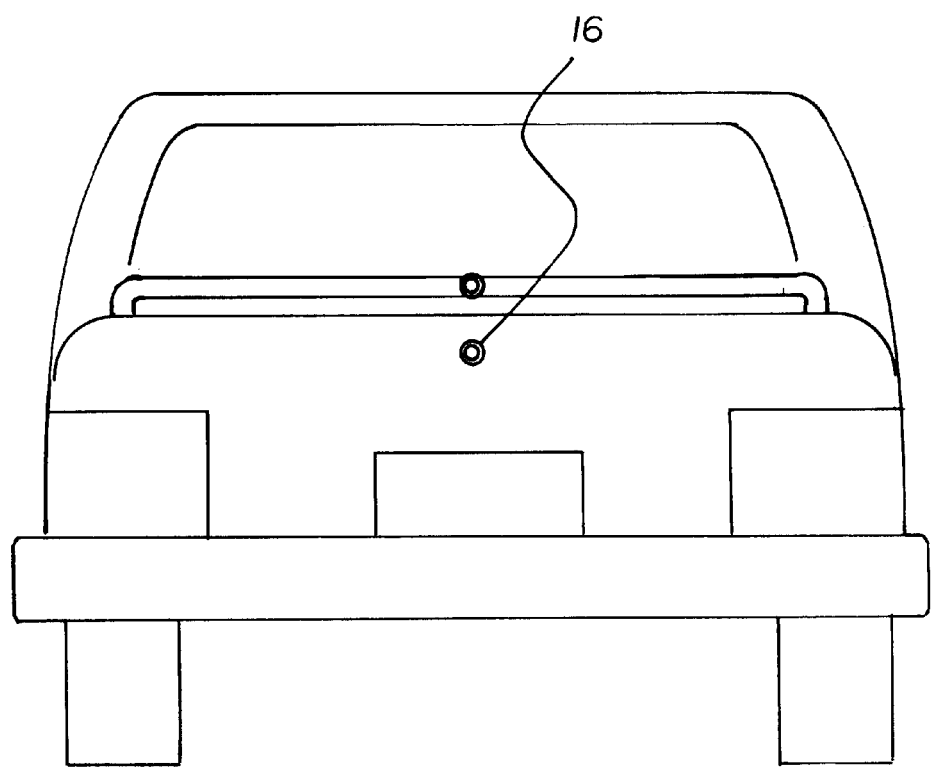
FIG 6

VEHICULAR CAMERA SYSTEM WITH PLURAL PERSPECTIVES

BACKGROUND OF THE INVENTION

1. Field of the Invention

The present invention relates to front and rear view vehicular cameras and more particularly pertains to a new vehicular camera system with plural perspectives for providing a plurality of vehicle mounted cameras for safety and monitoring purposes.

2. Description of the Prior Art

The use of front and rear view vehicular cameras is known in the prior art. More specifically, front and rear view vehicular cameras heretofore devised and utilized are known to consist basically of familiar, expected and obvious structural configurations, notwithstanding the myriad of designs encompassed by the crowded prior art which have been developed for the fulfillment of countless objectives and requirements.

Known prior art front and rear view vehicular cameras include U.S. Pat. No. 4,910,591; U.S. Pat. No. 5,648,835; U.S. Pat. No. 5,289,321; U.S. Pat. No. 5,027,200; U.S. Pat. No. 3,689,695; and U.S. Pat. No. 4,277,804.

In these respects, the vehicular camera system with plural perspectives according to the present invention substantially departs from the conventional concepts and designs of the prior art, and in so doing provides an apparatus primarily developed for providing a plurality of vehicle mounted cameras for safety and monitoring purposes.

SUMMARY OF THE INVENTION

In view of the foregoing disadvantages inherent in the known types of front and rear view vehicular cameras now present in the prior art, the present invention provides a new vehicular camera system with plural perspectives construction wherein the same can be utilized for providing a plurality of vehicle mounted cameras for safety and monitoring purposes.

The general purpose of the present invention, which will be described subsequently in greater detail, is to provide a new vehicular camera system with plural perspectives apparatus and method which has many of the advantages of the front and rear view vehicular cameras mentioned heretofore and many novel features that result in a new vehicular camera system with plural perspectives which is not anticipated, rendered obvious, suggested, or even implied by any of the prior art front and rear view vehicular cameras, either alone or in any combination thereof.

To attain this, the present invention generally comprises a vehicle having a pair of side rear view mirrors. Such side rear view mirrors are mounted to opposite doors of the vehicle. The vehicle further includes a dash, a turn signal level and a gear shift stick. Next provided is a pair of side front view cameras each mounted within one of the pair of side rear view mirrors of the vehicle. The side front view cameras serve to generate video signals of a perspective which faces forwardly and outwardly from the vehicle. Associated therewith is a central rear view camera mounted on a rear of the vehicle. The central rear view camera is adapted to generate video signals of a perspective which faces directly rearwardly from the vehicle. Mounted on the dash of the vehicle is a display for displaying video images upon the receipt of corresponding video signals. A transmitter is situated within the vehicle for transmitting the video signals via free space upon the receipt thereof. Also included is a processor connected between the turn signal levers, gear shift stick, cameras, transmitter and display. In operation, the processor functions to transmit the video signals of a right and left one of the side front view cameras to the display and transmitter upon the biasing of the turn signal lever in a right and left direction, respectively. Further, the processor is adapted to transmit the video signals of the central rear view camera to the display and transmitter upon the gear shift stick being situated in reverse. As an option, a manual override switch panel may be included for unconditionally transmitting the video signals from a user selected camera to the display.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicular camera system with plural perspectives apparatus and method which has many of the advantages of the front and rear view vehicular cameras mentioned heretofore and many novel features that result in a new vehicular camera system with plural perspectives which is not anticipated, rendered obvious, suggested, or even implied by any of the prior art front and rear view vehicular cameras, either alone or in any combination thereof.

It is another object of the present invention to provide a new vehicular camera system with plural perspectives which may be easily and efficiently manufactured and marketed.

It is a further object of the present invention to provide a new vehicular camera system with plural perspectives which is of a durable and reliable construction.

An even further object of the present invention is to provide a new vehicular camera system with plural perspectives which is susceptible of a low cost of manufacture with regard to both materials and labor, and which accordingly is then susceptible of low prices of sale to the consuming public, thereby making such vehicular camera system with plural perspectives economically available to the buying public.

Still yet another object of the present invention is to provide a new vehicular camera system with plural perspectives which provides in the apparatuses and methods of the prior art some of the advantages thereof, while simultaneously overcoming some of the disadvantages normally associated therewith.

Still another object of the present invention is to provide a new vehicular camera system with plural perspectives for providing a plurality of vehicle mounted cameras for safety and monitoring purposes.

Even still another object of the present invention is to provide a new vehicular camera system with plural perspectives that includes a vehicle having a plurality of controls including a turn lever. Also included is at least one camera adapted to generate video signals of a perspective which faces forwardly from either side of the vehicle. Next provided is a display mounted within the vehicle for displaying video images upon the receipt of corresponding video signals. A processor is adapted to transmit the video signals of a right and left perspective of the camera to the display upon the biasing of the turn signal lever in a right and left direction, respectively.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top view of a new vehicular camera system with plural perspectives according to the present invention.

FIG. 2 is a rear view of a first possible position of the central rear view camera of the present invention.

FIG. 5 is a top view of the present invention showing alternate positions of the central rear view camera.

FIG. 6 is a rear view of the present invention showing alternate positions of the central rear view camera.

DESCRIPTION OF THE PREFERRED EMBODIMENT

Figure 3:
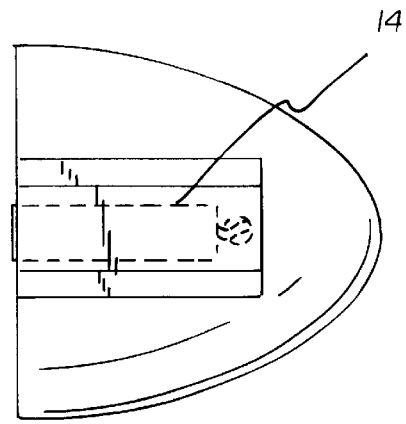
FIG. 3 is a top view of one of the side front view cameras of the present invention.
Figure 4:
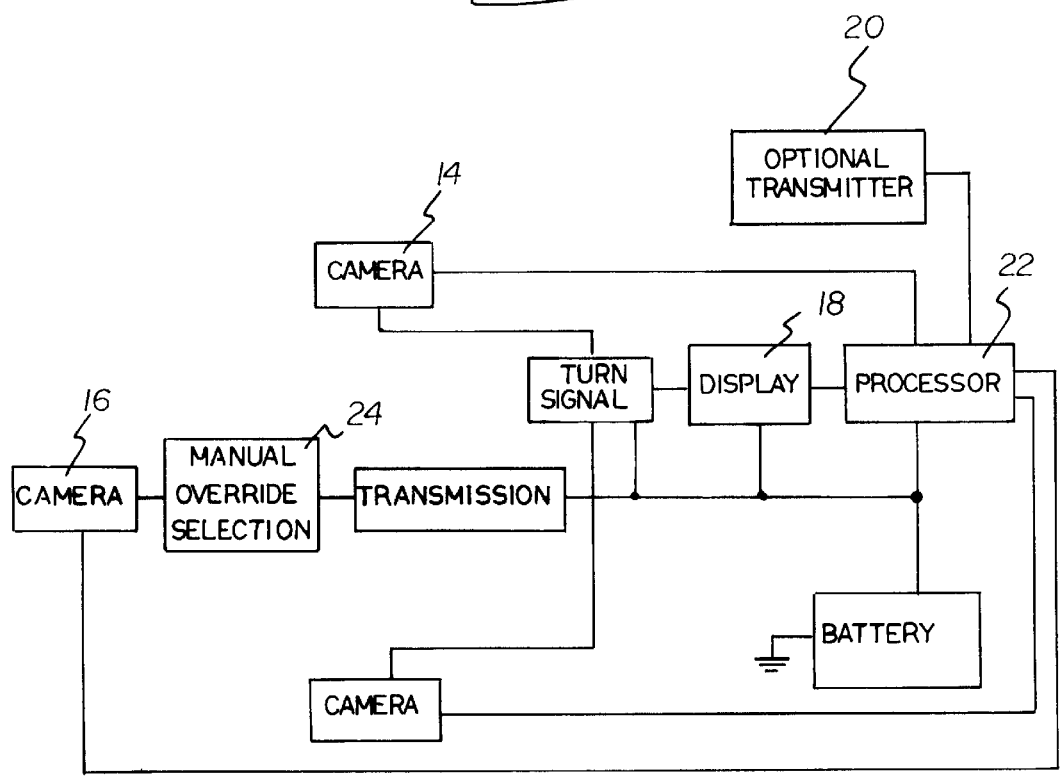
FIG. 4 is a schematic diagram of the present invention.

With reference now to the drawings, and in particular to FIGS. 1 through 6 thereof, a new vehicular camera system with plural perspectives embodying the principles and concepts of the present invention and generally designated by the reference numeral 10 will be described.

The present invention, designated as numeral 10, includes a vehicle 12 having a pair of side rear view mirrors. Such rear view mirrors are mounted to opposite doors of the vehicle. The vehicle further includes a dash, a turn signal lever and a gear shift stick.

Next provided is a pair of side front view cameras 14 each mounted within one of the pair of side rear view mirrors of the vehicle. The side front view cameras serve to generate video signals of a perspective which faces forwardly and optionally outwardly from the vehicle. In the preferred embodiment the side front view cameras reside within the housing on which the mirror of the vehicle is mounted.

Associated therewith is a central rear view camera 16 mounted on a rear of the vehicle. The central rear view camera is adapted to generate video signals of a perspective which faces directly rearwardly from the vehicle. It should be noted that the central rear view camera may be positioned in any one of various positions on the rear of the vehicle. For example, the central rear view camera may be mounted on a rear brake light of the vehicle, as shown in FIG. 2. Other options include positioning the rear cameras on a rear fin or trunk of a vehicle. Note FIGS. 5 & 6. As an option, the cameras may each have a pump blower assembly mounted adjacent thereto. Such pump blower serves to blow any water or debris from the lens of the camera. This precludes anything from obstructing the camera. Ideally, all cameras of the present invention are equipped with sufficient sensitivity as to allow the generation of video signals without an abundant supply of ambient light.

Mounted on the dash of the vehicle is a LCD display 18 for displaying video images upon the receipt of corresponding video signals. A transmitter 20 is also situated within the vehicle for transmitting the video signals via free space upon the receipt thereof. The video signals are preferably received by a stationary remote multi-video panel within a home for monitoring the vehicle when not in use.

Also included is a processor 22 connected between the turn signal levers, gear shift stick, cameras, transmitter and display. In operation, the processor functions to transmit the video signals of a right and left one of the side front view cameras to the display and transmitter upon the biasing of the turn signal lever in a right and left direction, respectively, Further, the processor is adapted to transmit the video signals of the central rear view camera to the display and transmitter upon the gear shift stick being situated in reverse. As such, a driver is afforded a unique rear perspective for each action taken.

Ideally, the transmitter transmits the video signals continuously from each of the cameras for security reasons. To further facilitate surveillance and monitoring of the interior of the vehicle, interior cameras may be employed in combination with the front and rear view cameras. Yet another option is to link a conventional alarm of the vehicle with the transmitter such that a visible signal is transmitted to the multi-video panel within the home when the alarm is tripped.

As an option, a manual override switch panel 24 may be included for unconditionally transmitting the video signals from a user selected camera to the display. To accomplish this, the switch panel may include a plurality of buttons each associated with one of the cameras for displaying the video signals thereof when depressed. The overriding nature of the switch panel may be deactuated when desired.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicular video system comprising, in combination:

a vehicle having a pair of side rear view mirrors which are mounted to opposite doors of the vehicle, a dash, a turn signal lever and a gear shift stick;

a pair of side front view cameras each mounted within one of the pair of side rear view mirrors of the vehicle, the side front view cameras adapted to generate video signals of a perspective which faces forwardly and outwardly from the vehicle;

a central rear view camera mounted on a rear of the vehicle, the central rear view camera adapted to generate video signals of a perspective which faces directly rearwardly from the vehicle;

a display mounted on the dash of the vehicle for displaying video images upon the receipt of corresponding video signals;

a transmitter situated within the vehicle for transmitting the video signals via free space upon the receipt thereof;

a processor connected between the turn signal levers, gear shift stick, cameras, transmitter and display, the processor adapted to transmit the video signals of a right and left one of the side rear view cameras to the display and transmitter upon the biasing of the turn signal lever in a right and left direction, respectively, the processor further adapted to transmit the video signals of the central rear view camera to the display and transmitter upon the gear shift stick being situated in reverse; and a manual override switch panel for unconditionally transmitting the video signals from a user selected camera to the display.

2. A vehicular video system comprising:

a vehicle having a plurality of controls including a turn lever;

at least one camera adapted to generate video signals of a perspective which faces rearwardly and outwardly from either side of the vehicle;

a display mounted within the vehicle for displaying video images upon the receipt of corresponding video signals;

a processor connected between the turn signal, camera, and display, the processor adapted to transmit the video signals of a right and left perspective of the camera to the display upon the biasing of the turn signal lever in a right and left direction, respectively; and a central rear view camera mounted on a rear of the vehicle, the central rear view camera adapted to generate video signals of a perspective which faces directly rearwardly from the vehicle, wherein the processor is adapted to transmit the video signals of the central rear view camera to the display upon a gear shift stick of the vehicle being situated in reverse.

3. A vehicular video system as set forth in claim 2 wherein a transmitter is situated within the vehicle for transmitting the video signals via free space upon the receipt thereof, wherein the transmitter transmits the video signals via free space for remote viewing.

4. A vehicular video system as set forth in claim 2 wherein a pair of cameras are each mounted within one of a pair of side rear view mirrors of the vehicle.

5. A vehicular video system as set forth in claim 2 and further including a manual override switch panel for unconditionally transmitting the video signals from a user selected camera perspective to the display.

6. A vehicular video system for mounting on a vehicle having a pair of side rear view mirrors which are mounted to opposite doors of the vehicle, a dash, a turn signal lever and a gear shift stick, said system comprising:

a pair of side rear view cameras each mounted within one of the pair of side rear view mirrors of the vehicle, the side rear view cameras adapted to generate video signals of a perspective which faces rearwardly and outwardly from the vehicle;

a central rear view camera mounted on a rear of the vehicle, the central rear view camera adapted to generate video signals of a perspective which faces directly rearwardly from the vehicle;

a display mounted on the dash of the vehicle for displaying video images upon the receipt of corresponding video signals;

a transmitter situated within the vehicle for transmitting the video signals via free space upon the receipt thereof;

a processor connected between the turn signal levers, gear shift stick, cameras, transmitter and display, the processor adapted to transmit the video signals of a right and left one of the side rear view cameras to the display and transmitter upon the biasing of the turn signal lever in a right and left direction, respectively, the processor further adapted to transmit the video signals of the central rear view camera to the display and transmitter upon the gear shift stick being situated in reverse; and a manual override switch panel for unconditionally transmitting the video signals from a user selected camera to the display.

* * * * *